United States Patent Office 3,764,334
Patented Oct. 9, 1973

3,764,334
NON-SILVER PHOTOSENSITIVE COMPOSITION CONTAINING A BIS-CYCLIC NITROGEN COMPOUND, AN ARYL AMINE, AND AN ORGANIC HALOGEN COMPOUND
Eugene Wainer, Shaker Heights, and James F. Betts, Euclid, Ohio, assignors to Horizons Incorporated, a division of Horizons Research Incorporated
No Drawing. Filed Sept. 22, 1971, Ser. No. 182,918
Int. Cl. G03c 1/52
U.S. Cl. 96—90 R          6 Claims

ABSTRACT OF THE DISCLOSURE

The sensitometric properties of dry, non-silver photographic compositions whose essential ingredients consist principally of an aryl amine and an activator, such as an organic halogen compound, capable of producing color from such amine on exposure to light, are found to be modified by the addition of minor amounts of bis-nitrogen cyclic compounds. The use of these compounds in a preferred range yields a substantial increase in contrast, gamma, and, in some cases, photographic speed over that exhibited by identical formulations in the absence of such compounds.

BACKGROUND

This invention relates to the field of photosensitive compositions consisting essentially of an aromatic amine compound and an organic halogen compound or other activator for the amine. Compositions of this type and modifications thereof are described in each of the following United States patents and publications, the disclosures of which are intended to be incorporated herein by reference.

UNITED STATES PATENTS

| | | |
|---|---|---|
| 3,042,515 | 3,102,029 | 3,147,117 |
| 3,042,516 | 3,102,810 | 3,155,509 |
| 3,042,517 | 3,104,973 | 3,154,416 |
| 3,042,518 | 3,106,466 | 3,164,467 |
| 3,042,519 | 3,109,736 | 3,202,507 |
| 3,046,125 | 3,112,200 | 3,272,635 |
| 3,046,209 | 3,113,024 | 3,275,443 |
| 3,050,673 | 3,114,635 | 3,285,744 |
| 3,082,086 | 3,121,632 | 3,510,304 |
| 3,095,303 | 3,121,633 | 3,533,792 |
| 3,100,703 | 3,140,948 | 3,573,046 |
| 3,102,027 | 3,140,949 | 3,539,346 |

PUBLICATIONS

Photographic Science and Engineering, vol. 5, No. 2, March–April, 1961, pp. 98–103.
Photographic Science and Engineering, vol. 8, No. 2, March–April, 1964, pp. 91–95.
Photographic Science and Engineering, vol. 8, No. 2, March–April, 1964, pp. 95–103.
Photographic Science and Engineering, vol. 9, No. 2, March–April, 1965, pp. 133–137.

As defined in U.S. Pat. No. 3,510,300, these systems can be optically developed in which case an extremely brief exposure to radiation of a proper wavelength is first made, followed by blanket exposure to light of a longer wavelength thereafter is heated and fixed. Under these conditions, the result normally obtained, while of high photographic speed, yields a relatively low contrast, low D-max. rendition normally designated in the trade as "soft-working."

U.S. Pat. 3,573,046 describes a heat treatment process for control of contrast and gamma. Gamma is defined as the relationship between the developed optical density and the log exposure scale, in units to be defined later. As shown in U.S. Pat. No. 3,573,046 control of the heat treatment process provides a gamma range as a function of time and temperature of heat development between 0.6 and 2.3.

OBJECTS OF THE INVENTION

In the field of photoduplication, in the preparation of images for photomechanical purposes, and in the exposure of photoresists it is necessary to have an intermediate or master for suitable exposure of the generated duplicate whether such duplicate is a photomask, a photoresist, a disposable intermediate for printing photoresists and the like which not only generally exhibits a relatively high net optical density in the visible, but exhibits these desired characteristics to a much greater extent in a wavelength range between 3300 A. to 4100 A. In order to obtain such characteristics under reasonable exposure times, the photographic speed also must be relatively high in the desired range, again in photographic parlance. The most desirable characteristics for the uses defined in the foregoing sentence is in the item which is generally designated in the trade as a "high ultraviolet holdback," which sensitometrically is obtained by a combination of high contrast, high gamma, coupled with adequate speed so that unduly lengthy times of exposure are not required.

It is thus the object of this invention to define chemical modifications of compositions of the type described in the foregoing list of United States patents which transform these normally soft-working, low gamma, low contrast materials into hard-working, high gamma, high contrast renditions on a controlled basis and considerably beyond any such change which has been defined in the referred to background patent and publication literature.

SUMMARY

In general terms, the present invention relates to photosensitive compositions resulting from the addition of minor amounts of bis-nitrogen ring compounds to otherwise known photosensitive compositions which contain among other agents a combination of at least one aryl amine compound and at least one suitable organic halogen compound or other activator for the amine. In surprisingly small quantities these bis-nitrogen ring compounds produce a remarkable increase in gamma, net density, and maximum density, and, in some cases, also produce a significant increase in photographic speed. The effect of these agents is generally in the field of free radical photography as defined in the foregoing list of United States patents whether the activator in question is an organic halogen compound or one of the other types of activators, such as mercaptobenzothiazole, which have been found to produce color from a substituted organic amine compound when the organic amine exposed to light in the presence of such activator.

DESCRIPTION

Aryl amines which have been used in this invention are described in the above patents and are generally described by the formula

wherein R represents an aryl nucleus such as benzene, naphthalene or anthracene which may be either unsubstituted or substituted, e.g., with alkyl, halogen or other groups or R may represent a heterocyclic nucleus, such as xanthene, quinoline or other heterocyclic nucleus which includes one or more atoms of O, S, Se, N or other atoms in addition to the carbon atoms necessary to complete the ring, and X and Y are each selected from the group consisting of alkyl, aryl, arylalkyl, halogen and hydrogen and may be either the same or different (see U.S. Pat. No. 3,042,515).

While activators of the several types described in the foregoing United States patents are effective for the purpose of this invention, the preferred activators comprise the following organic halogen compounds: carbon tetrabromide, bromoform, hexabromoethane, iodoform, hexachloroethane, pentabromoethane, 1,1,2,2-tetrabromoethane, $\alpha,\alpha,\alpha$-tribromoacetophenone.

The photosensitive formulations described in the patents noted above are effective for the purpose of this invention. However, specific formulations which are particularly preferred as possessing properties suitable for use as a photointermediate, as a master for the exposure of color blind materials and/or as a means for modifying and controlling the contrast of original negatives which exhibit a low contrast rendition are given as Formulas 1 through 7 following:

FORMULA 1.—BLUE

| | |
|---|---|
| Diphenylamine | g__ 75 |
| Carbon tetrabromide | g__ 200 |
| 2,6-di-t-butyl-p-cresol | g__ 25 |
| Triphenyl stibine | g__ 10 |
| Polystyrene (10% in benzene) | liters__ 3 |
| Acetone | do____ 1 |
| Benzene | do____ 1 |

(Fixing temperature=110° C. for 2 minutes.)

FORMULA 2.—RED-PINK

| | |
|---|---|
| Indole | g__ 80 |
| Carbon tetrabromide | g__ 200 |
| 2,6-di-t-butyl-p-cresol | g__ 25 |
| Triphenyl stibine | g__ 10 |
| Polystyrene (10% in benzene) | liters__ 3 |
| Acetone | do____ 1 |
| Benzene | do____ 1 |

(Fixing temperature=110° C. for 2 minutes.)

FORMULA 3.—BLUE-BLACK

| | |
|---|---|
| Diphenylamine | g__ 75 |
| 4-amino 3,5-diphenyl pyrazole | g__ 10 |
| 2,6-di-t-butyl-p-cresol | g__ 25 |
| Triphenyl stibine | g__ 10 |
| Carbon tetrabromide | g__ 200 |
| Polystyrene (10% in benzene) | liters__ 3 |
| Acetone | do____ 1 |
| Benzene | do____ 1 |

(Fixing temperature=110° C. for 2 minutes.)

FORMULA 4.—BLUE

| | |
|---|---|
| 1,1-bis(p-dimethylaminophenyl)ethylene | g__ 100 |
| Iodoform | g__ 200 |
| 2,6-di-t-butyl-p-cresol | g__ 25 |
| Triphenyl stibine | g__ 10 |
| Triphenyl amine | g__ 25 |
| Polycarbonate solution (Ratio=15.2 gms. polycarbonate: 135 g. methylene dichloride) | g__ 800 |
| Methylene dichloride | liters__ 2 |

(Fixing temperature=160° C.–170° C. for 2 minutes.)

FORMULA 5.—MAGENTA-VIOLET

| | |
|---|---|
| 1,1-bis(p-dimethylaminophenyl)ethylene | g__ 100 |
| Triphenyl stibine | g__ 10 |
| 2,6-di-t-butyl-p-cresol | g__ 50 |
| 4-picoline-1-oxide | g__ 32 |
| 4-aminoantipyrine | g__ 22 |
| Iodoform | g__ 200 |
| Polycarbonate solution (Ratio=15.2 gms. polycarbonate: 135 g. methylene dichloride) | liters__ 5 |
| Methylene dichloride | do____ 1 |

(Fixing temperature=160° C.–170° C. for 2 minutes.)

FORMULA 6.—GREEN

| | |
|---|---|
| 1,1-bis(p-dimethylaminophenyl)ethylene | g__ 100 |
| Triphenyl stibine | g__ 10 |
| 2,6-di-t-butyl-p-cresol | g__ 50 |
| 4-picoline-1-oxide | g__ 32 |
| Acetoacetanilide | g__ 26 |
| Iodoform | g__ 200 |
| Polycarbonate solution (Ratio=15.2 g. polycarbonate: 135 g. methylene dichloride) | liters__ 5 |
| Monochlorbenzene | do____ 1 |

(Fixing temperature=160° C.–170° C. for 2 minutes.)

FORMULA 7.—BLACK

| | |
|---|---|
| 1,1-bis(p-dimethylaminophenyl)ethylene | g__ 100 |
| Triphenyl stibine | g__ 10 |
| 2,6-di-t-butyl-p-cresol | g__ 50 |
| 4-picoline-1-oxide | g__ 32 |
| Acetoacetanilide | g__ 26 |
| 4-aminoantipyrine | g__ 22 |
| Iodoform | g__ 200 |
| Polycarbonate solution (Ratio=15.2 g. polycarbonate: 135 g. methylene dichloride) | liters__ 5 |
| Benzene | do____ 1 |

(Fixing temperature=160° C.–170° C. for 2 minutes.)

In Formulas 1 through 7, the triphenyl stibine is an optional constituent added to provide stability to the formula. Equivalent materials are described in U.S. Pat. No. 3,275,443. The 2,6-di-tert-butyl-p-cresol can be replaced with other phenolic compounds, as described in U.S. Pat. No. 3,510,309.

The acetone, benzene, methylene dichloride and chlorbenzene are present as solvents for the remaining constituents and the formulations are made up from the individual ingredients, added in seriatim to the solvent or mixture of solvents, e.g., as described in the publications listed above.

The polystyrene and polycarbonate are "binders" in which the remaining constituents are supported either in solution or as a dispersion.

Other binder-solvent combinations are disclosed in U.S. Pat. 3,042,515, for example in Table 1 of that patent and in others of the above noted patents.

The diphenylamine, indole, diphenylamine and 1,1-bis-(p-dimethylaminophenyl)ethylene are all color forming aryl amines.

Other proportions which have been used are described in U.S. Pat. 3,042,515 and in others of the above listed patents.

PREFERRED COMPOSITION RANGES OF INGREDIENTS

| Reagent | Parts by weight | Parts/5,000 total |
|---|---|---|
| Solvent | 500–3,000 | 4,000 |
| Resin | 100–800 | 500 |
| Arylamine | 10–200 | 100 |
| Activator | 50–350 | 200 |
| Stabilizer [1] (triaryl stibine) | 5–25 | 10 |
| Stabilizer [1] (cresol) | 10–50 | 25 |
| N-oxide [1] | | |
| Acetoanilide [1] | | |

[1] Optional.

The manner of use of the compositions is the same as that taught in the above patent and literature references and comprises preparing a solution of the listed constituents in the indicated solvent, application of a thin layer of the resulting composition to a suitable substrate, e.g., with a doctor blade, elimination of the solvent or at least a large portion thereof by evaporation, photographic exposure of the resulting film to a photographic subject and, if desired, blanket exposure of the photographically exposed film, followed by fixing (optional).

While these materials may have their speed increased through the technique of optical development, as defined in the aforementioned U.S. Pat. No. 3,510,300, in order to simplify the equipment in the processing as is common in the photoduplication art, it is preferable to use the techniques of heat fixing and development as defined in U.S. Pat. No. 3,573,046.

In the list of formulations given above, the temperature conditions are attached to each formulation for the normally preferred condition, and the conditions under which the sensitometry to be described later is defined for each of the formulations given. Fixing temperatures for Formulas 1, 2 and 3 may be lowered to as low as 90° C., providing the time is increased to 4 minutes, whereas fixing times may be decreased to as short a time as 30 seconds by increasing the temperature into a range of 130 to 140° C. For Formulas 4, 5, 6 and 7, fixing temperatures again may be lowered to as low as 140° C. for 5 minutes or may be reduced to as short a time as 15 seconds for fixing and developing in a temperature range of 180 to 190° C.

In the practice of this invention preferred bis nitrogen compounds are set forth in Table 1 which follows. In general, these are aromatic of cycloaliphatic compounds containing, at least one ring including two nitrogen atoms para to each other and not further substituted, i.e., compounds containing a 1,4 diazine nucleus

to which one or more aromatic or cycloaliphatic or heterocyclic rings may be fused, or bis-nitrogen compounds, such as bis-pyridines

The preferred compounds for increasing gamma and contrast are listed in Table 1 and for emphasis it is noted that these are all bis-nitrogen ring compounds in which the nitrogen is a constituent of the ring itself. The compounds which are most effective are those which have no substitutent attached to the nitrogen other than the ring components. Modifications which have a hydrogen or an alkyl group attached to the nitrogen are effective but to a lesser extent than those in which the nitrogens are unsubstituted.

The ranges of concentration of the bis-nitrogen compounds listed in Table 1 vary with the nature of the compound. In general, the broad range for these compounds, while still maintaining utility, is between 0.1 gram and 25 grams for each 100 grams of organic amine, with certain exceptions. For example, for the diazobicyclo and tetraazotricyclo compounds listed in the table, these are found to be extremely powerful in their desired effect in surprisingly low concentration ranges. A noticeable effect is obtained in a concentration range as low as 0.1 gram. The preferred range is between 0.5 and 2 grams. While the effect on gamma is still noticeable amounts higher than 5 grams start to show a specific deleterious effect in that both D-max. and photographic speed are sharply reduced.

TABLE 1

Compounds effective for increasing gamma and contrast (bis-N ring compounds)

(1) 1,4-diazabicyclo[2.2.2]octane
(2) 1,5-diazabicyclo[3.2.2]nonane
(3) Pyrazine
(4) Piperazine
(5) Phenazine
(6) Pteridine
(7) Pyrazino[2,3-b]pyrazine
(8) Other 1,4-diazines
(9) Quinoxaline
(10) 1,2,3,4-tetrahydroquinoxaline
(11) 4,4'-bipyridine
(12) Pyrazino[2,3-g]quinoxaline
(13) 1,4,7,10-tetraazatricyclo[8.8.2.2$^{4,7}$]hexadecane Specifically, whereas the photographic speed for Formula 7 is in the range of 5 millijoules for an addition of 1 gram of compound No. 1 in Table 1 at 5 grams, still an acceptable result is obtained, except that this photographic speed is 60 millijoules and the D-max. is 1.8 At 10 grams, the D-max. has been reduced below a figure of 1.0 and the photographic speed is well in excess of 200 millijoules which does not suit the purposes for practical utility. The same considerations with regard to range and preferred range are effective for all of the diazocyclo and the triazocyclo compounds. Much broader ranges can be used for the remaining compounds given in Table 1. The effective range is between 1 gram and 25 grams with a prefered range between 3 and 7 grams. Even at 25 grams, a gamma of approximately 3 is achieved with a D-max. of approximately 2.8, still effective for the purposes of this invention.

DEFINITIONS

In the present description, the terminology used for defining the sensitometry is defined as follows:

Gamma is defined as the slope of the straightline portion of a curve obtained by plotting optical density against a log exposure scale in which such exposure is defined in basic energy units. Such basic energy units are milliwatts per square centimeter per second (millijoules/cm.$^2$).

Optical density is defined as diffuse transmission density and when a specific wavelength is indicated in the tables dealing with sensitometry this means that the density has been measured at the wavelength indicated with a calibrated densitometer fitted with specialized narrow band pass filters.

D-min. is the optical density measured in the non-image areas which in reality provides a measurement of a combination of the optical densities of the base plus fog areas. D-max. is the maximum optical density recorded by a suitable instrument. The majority of instruments used for this purpose are generally read to a maximum density of 3.0. In order to extend the range of such instruments, a calibrated neutral density filter is inserted in the light path.

In the sensitometric tables, speed is defined as the number of millijoules/cm.$^2$ (under specified conditions) to achieve a net optical density of 1.0.

Exposure for all items of data given in the sensitometric tables was made in a sensitometer employing a properly calibrated medium pressure mercury arc lamp with a quartz envelope. Exposure was carried out by irradiating the photosensitive material to the mercury arc light source previously defined utilizing a 21-step-wedge square root of 2 steptablet made by appropriate evaporation of nickel on a quartz base.

Heat fixing was accomplished at the temperatures indicated for the formulations in an air convection oven. Formulas 1 through 7 all were applied to a subbed polyester base at a wet thickness of 3-mils, and immediately thereafter each formulation was dried for 30 seconds at 90° C. for the elimination of the solvent. If desired, the formulations achieved adequate dryness for processing purposes by permitting the materials to stand in the dark at room temperature for approximately 3 hours. Coating the formulations on a suitable substrate is invariably carried out under red light conditions.

While we do not wish to be bound to any specific theory, evidence available in the literature (page 118, "Topics in Heterocyclic Chemistry," by R. N. Castle, Wiley-Interscience, New York, 1969) appears to indicate that the basis for the action available from the compounds listed in Table 1 might be due to the free-radical formation of a nitrogen radical cation in which the single electron necessary for definition of the presence of a free-radical is available on the nitrogen and the nitrogen continues to be an integral member of the ring structure.

EXAMPLES

Examples of the invention are set forth in Tables 2 through 8 following:

TABLE 2

| Formula No. | Speed | Gamma | D-max. | D-min. |
|---|---|---|---|---|
| 1 | 300 | 1.0 | 1.2 | 0.06 |
| 2 | 400 | 0.9 | 1.0 | 0.06 |
| 3 | 180 | 1.3 | 1.4 | 0.07 |
| 4 | 60 | 1.3 | 1.5 | 0.07 |
| 5 | 45 | 1.0 | 1.9 | 0.07 |
| 6 | 40 | 1.1 | 1.7 | 0.07 |
| 7 | 35 | 1.2 | 1.6 | 0.07 |

TABLE 3

[Sensitometry of Formulas 1 through 7 in the visible after adding to each 1 gram of 1,4-diazobicyclo[2.2.2]octane]

| Example No. | Modified Formula No. | Speed | Gamma | D-max. | D-min. |
|---|---|---|---|---|---|
| 1 | 1 | 180 | 2.1 | 2.8 | 0.06 |
| 2 | 2 | 240 | 2.0 | 2.4 | 0.06 |
| 3 | 3 | 60 | 3.2 | 3.3 | 0.10 |
| 4 | 4 | 18 | 3.8 | 3.6 | 0.06 |
| 5 | 5 | 20 | 2.7 | 3.3 | 0.08 |
| 6 | 6 | 25 | 2.1 | 2.1 | 0.06 |
| 7 | 7 | 10 | 2.6 | 3.2 | 0.06 |

TABLE 4

[Sensitometry of Formulas 1 through 7 measured at 3,660 A.]

| Formula No. | Speed | Gamma | D-max. | D-min. |
|---|---|---|---|---|
| 1 | 190 | 1.6 | 1.8 | 0.16 |
| 2 | 80 | 1.9 | 2.1 | 0.35 |
| 3 | 60 | 1.6 | 2.0 | 0.40 |
| 4 | 41 | 1.7 | 2.1 | 0.23 |
| 5 | 32 | 2.1 | 2.2 | 0.24 |
| 6 | 28 | 2.2 | 2.7 | 0.26 |
| 7 | 15 | 2.4 | 2.9 | 0.18 |

TABLE 5

[Sensitometry of Formulas 1 through 7 measured at 4,046 A.]

| Formula No. | Speed | Gamma | D-max. | D-min. |
|---|---|---|---|---|
| 1 | 350 | 1.0 | 1.4 | 0.12 |
| 2 | 110 | 1.2 | 1.6 | 0.16 |
| 3 | 90 | 1.1 | 1.4 | 0.10 |
| 4 | 137 | 0.9 | 1.3 | 0.18 |
| 5 | 40 | 1.6 | 1.9 | 0.10 |
| 6 | 35 | 1.9 | 2.4 | 0.10 |
| 7 | 20 | 2.1 | 2.4 | 0.12 |

TABLE 6

[Sensitometry of Formulas 1 through 7 measured at 3,660 A. after adding to each 1 gram of 1,4-diazobicyclo [2.2.2]octane]

| Example No. | Modified Formula No. | Speed | Gamma | D-max. | D-min |
|---|---|---|---|---|---|
| 8 | 1 | 60 | 2.8 | 3.4 | 0.18 |
| 9 | 2 | 40 | 2.8 | 3.5 | 0.32 |
| 10 | 3 | 35 | 3.1 | 3.7 | 0.28 |
| 11 | 4 | 11 | 2.7 | 3.3 | 0.21 |
| 12 | 5 | 9 | 4.3 | 4.9 | 0.18 |
| 13 | 6 | 18 | 5.5 | 4.7 | 0.22 |
| 14 | 7 | 5 | 5.1 | 5.2 | 0.25 |

TABLE 7

[Sensitometry of Formulas 1 through 7 measured at 4,046 A. after adding to each 1 gram of 1,4-diazobicyclo[2.2.2]octane]

| Example No. | Modified Formula No. | Speed | Gamma | D-max. | D-min. |
|---|---|---|---|---|---|
| 15 | 1 | 110 | 2.1 | 2.6 | 0.09 |
| 16 | 2 | 80 | 2.8 | 3.4 | 0.22 |
| 17 | 3 | 40 | 3.1 | 3.7 | 0.14 |
| 18 | 4 | 26 | 2.3 | 2.4 | 0.10 |
| 19 | 5 | 18 | 3.3 | 3.6 | 0.14 |
| 20 | 6 | 22 | 4.5 | 2.9 | 0.10 |
| 21 | 7 | 8 | 4.1 | 4.2 | 0.22 |

TABLE 8

[Sensitometry of Formula 7 measured at 3,660 A. after adding specified amounts of bis-n-ring compounds listed in table 1]

| Example No. | Additions to Formula 7 (See Table 1) | Speed | Gamma | D-max. | D-min. |
|---|---|---|---|---|---|
| 14 | 1 g., compound 1 | 5 | 5.1 | 5.2 | 0.18 |
| 22 | 1 g., compound 2 | 3 | 7.5 | 6.0 | 0.33 |
| 23 | 3 g., compound 3 | 11 | 4.7 | 4.8 | 0.24 |
| 24 | 5 g., compound 4 | 7 | 5.0 | 4.8 | 0.22 |
| 25 | 7 g., compound 5 | 14 | 4.3 | 3.9 | 0.24 |
| 26 | 3 g., compound 6 | 12 | 4.4 | 4.0 | 0.22 |
| 27 | 4 g., compound 7 | 12 | 4.6 | 4.2 | 0.26 |
| 28 | 1 g., compound 2 | 4 | 7.8 | 5.9 | 0.22 |
| 29 | 7 g., compound 9 | 15 | 5.5 | 4.8 | 0.18 |
| 30 | 7 g., compound 10 | 16 | 4.9 | 4.4 | 0.18 |
| 31 | 5 g., compound 11 | 8 | 6.2 | 5.8 | 0.24 |
| 32 | 5 g., compound 12 | 15 | 4.3 | 3.9 | 0.22 |
| 33 | 1 g., compound 13 | 4 | 7.6 | 5.8 | 0.24 |

The definitions as to methods of measurement, interpretation of measurement, preparation of the film, and exposure have been given previously.

We claim:

1. In a non-silver photosensitive composition in which a color is produced as a result of exposure to radiation of a suitable wavelength, which composition contains as essential constitutents at least one color-forming substituted organic amine compound represented by the general formula $$R-N\begin{matrix}X\\Y\end{matrix}$$

in which R represents an aryl nucleus or a heterocyclic nucleus and X and Y are each selected from the group consisting of alkyl, aryl, arylalkyl, halogen and hydrogen and at least one organic halogen compound which is an activator which promotes the formation of color when said amine is exposed to said radiation, the improvement which comprises providing at least one hetero nitrogen cyclic compound in said composition whereby said photosensitive composition exhibits a substantial increase in contrast and gamma as compared with otherwise identical formulations from which such hetero-nitrogen cyclic compounds have been omitted;

said hetero-nitrogen-cyclic compound being selected from the group consisting of (1) compounds containing a 1,4 diazene nucleus represented by the general formula

to which one or more aromatic cycloaliphatic, or heterocyclic rings may be fused, where each nitrogen is either unsubstituted or substituted with hydrogen, or attached to a carbon atom forming part of a fused ring system, and (2) compounds containing a 4,4'-bipyridine or 4,4'-bipiperidine nucleus represented by the general formula

to either or both nuclei of which one or more aromatic, cycloaliphatic, or heterocyclic rings may be fused, and the N atoms are either unsubstituted, or substituted with hydrogen or attached to a carbon atom forming part of a fused ring system.

2. The composition of claim 1 in which the bis-nitrogen compound is a compound which includes a 1,4-diazine nucleus in its structure.

3. The composition of claim 1 in which the proportions of bis-cyclic nitrogen compound to organic amine are between about 0.1 gram and 25 grams for each 100 grams of organic amine.

4. The composition of claim 1 in which the bis-cyclic nitrogen compound is 1,5-diazabicyclo[3.2.2]nonane.

5. The composition of claim 1 including, as the activator, at least one organic halogen compound in which at least three halogen atoms are attached to a single carbon atom, the halogen atoms being selected from the group consisting of Cl, Br and I.

6. The composition of claim 1 in which the bis-nitrogen compound is a compound which includes a bis-pyridine nucleus in its structure.

References Cited
UNITED STATES PATENTS

| | | | |
|---|---|---|---|
| 3,615,564 | 10/1971 | Mattor | 96—90 |
| 3,597,212 | 8/1971 | Webster et al. | 96—90 |
| 3,481,739 | 12/1969 | Wainer et al. | 96—90 |

NORMAN G. TORCHIN, Primary Examiner

W. H. LOUIE, JR., Assistant Examiner